(12) United States Patent
Kutthumolu et al.

(10) Patent No.: US 12,271,509 B2
(45) Date of Patent: Apr. 8, 2025

(54) CLOUD INFRASTRUCTURE USING MACHINE LEARNING AND NON-FUNGIBLE TOKENS (NFT) FOR ENHANCED SECURITY

(71) Applicant: Bank of America Corporation, Charlotte, NC (US)

(72) Inventors: Durga Prasad Kutthumolu, Hyderabad (IN); Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 166 days.

(21) Appl. No.: 18/140,828

(22) Filed: Apr. 28, 2023

(65) Prior Publication Data

US 2024/0362368 A1    Oct. 31, 2024

(51) Int. Cl.
*G06F 21/64* (2013.01)
*H04L 67/1097* (2022.01)

(52) U.S. Cl.
CPC .......... *G06F 21/64* (2013.01); *H04L 67/1097* (2013.01)

(58) Field of Classification Search
CPC ...... G06F 21/64; H04L 67/1097; H04L 67/01
See application file for complete search history.

(56) References Cited

U.S. PATENT DOCUMENTS

| | | | |
|---|---|---|---|
| 11,635,896 B2 | 4/2023 | Kim | |
| 11,635,901 B2 | 4/2023 | Yang | |
| 11,636,030 B2 | 4/2023 | Chen | |
| 11,636,032 B2 | 4/2023 | Jeong et al. | |
| 11,636,041 B2 | 4/2023 | Nayak et al. | |
| 11,636,042 B2 | 4/2023 | Chen | |
| 11,636,069 B2 | 4/2023 | Nuttle | |
| 11,636,289 B2 | 4/2023 | Guo | |
| 11,636,396 B2 | 4/2023 | Sarin | |
| 11,636,562 B2 | 4/2023 | Smith | |
| 2022/0210061 A1* | 6/2022 | Simu | H04L 9/3239 |
| 2023/0119999 A1 | 4/2023 | Benoit et al. | |
| 2023/0120600 A1 | 4/2023 | Benisty et al. | |
| 2023/0123596 A1 | 4/2023 | Danilov et al. | |
| 2023/0124827 A1 | 4/2023 | Dornemann et al. | |
| 2023/0125593 A1 | 4/2023 | Mahony et al. | |
| 2023/0125995 A1 | 4/2023 | Kim et al. | |
| 2023/0126110 A1 | 4/2023 | Bhat et al. | |

(Continued)

*Primary Examiner* — Jonathan A Bui
(74) *Attorney, Agent, or Firm* — Banner & Witcoff, Ltd.

(57) ABSTRACT

A computing platform may train, using historical information classification information, an information classification model, which may configure the information classification model to classify information and identify, based on the classification, a storage location. The computing platform may receive, from a user device, a request to store information. The computing platform may identify, using the information classification model, a cloud based storage location for the information. The computing platform may generate an NFT representative of the first cloud based storage location. The computing platform may direct a cloud based storage system to store the information at the cloud based storage location. The computing platform may send, to the user device, the NFT. The computing platform may receive, from the user device, the NFT and a request to access the information. Based on validating the NFT, the computing platform may grant the user device access to the information.

20 Claims, 10 Drawing Sheets

(56) References Cited

U.S. PATENT DOCUMENTS

| | | |
|---|---|---|
| 2023/0126812 A1 | 4/2023 | Goulon et al. |
| 2023/0127430 A1 | 4/2023 | Hu et al. |
| 2023/0129705 A1 | 4/2023 | Wiklof et al. |
| 2024/0073198 A1* | 2/2024 | Lee ................. H04L 63/083 |
| 2024/0113883 A1* | 4/2024 | Perkins ............ H04L 9/3213 |
| 2024/0171398 A1* | 5/2024 | Kendapadi .......... H04L 9/50 |
| 2024/0202849 A1* | 6/2024 | Kawaguchi ...... G06Q 50/184 |
| 2024/0250820 A1* | 7/2024 | Osborn ............... H04L 9/50 |
| 2024/0289783 A1* | 8/2024 | Alsahnawi ...... G06Q 20/3825 |

* cited by examiner

CLOUD INFRASTRUCTURE USING MACHINE LEARNING AND NON-FUNGIBLE TOKENS (NFT) FOR ENHANCED SECURITY

BACKGROUND

In some instances, cloud computing may provide on-demand availability of computer system resources, especially data storage and computing power, without direct active management by users. In some instances, large clouds may have functions distributed over multiple locations, each of which may be a data center. In some instances, however, cloud storage may create security risks as users might not be aware of where exactly their data is stored. Accordingly, as the use of cloud storage becomes increasingly prevalent, it may be important to provide measures for improved information security and ownership in cloud environments.

SUMMARY OF THE INVENTION

Aspects of the disclosure provide effective, efficient, scalable, and convenient technical solutions that address and overcome the technical problems associated with cloud storage. In accordance with one or more embodiments of the disclosure, a computing platform comprising at least one processor, a communication interface, and memory storing computer-readable instructions may train, using historical information classification information, an information classification model, which may configure the information classification model to classify information and identify, based on the classification, a storage location. The computing platform may receive, from a user device, a request to store first information. The computing platform may identify, using the information classification model, a first cloud based storage location for the first information. The computing platform may generate a first non-fungible token (NFT) representative of the first cloud based storage location. The computing platform may send one or more commands directing a cloud based storage system to store the first information at the first cloud based storage location, which may cause the cloud based storage system to store the first information at the first cloud based storage location. The computing platform may send, to the user device, the first NFT. The computing platform may receive, from the user device, the first NFT and a first request to access the first information. The computing platform may validate the first NFT. Based on validating the first NFT, the computing platform may grant the user device access to the first information.

In one or more instances, the historical information classification information may include information metadata, sensitivity levels, processing requirements, cross border movement requirements, latency requirements, information classification labels, and/or other information. In one or more instances, identifying, using the information classification model, the first cloud based storage location for the first information may include: 1) extracting metadata for the first information, where the metadata may include one or more of: sensitivity levels, processing requirements, cross border movement requirements, or latency requirements, 2) identifying, by using the metadata of the first information to classify the first information based on the historical information classification information, one or more classification labels for the first information, and 3) identifying, based on the one or more classification labels, the first cloud based storage location.

In one or more examples, the first cloud based storage location may include a cluster, a data center within the cluster, a rack within the data center, server within the rack, and a node within the server. In one or more examples, the computing platform may store, using a distributed ledger, the first NFT, where validating the first NFT may include validating, using the distributed ledger, the first NFT.

In one or more instances, based on failing to validate the first NFT, the computing platform may deny the user device access to the first information. In one or more instances, the computing platform may update, using a dynamic feedback loop and based on the first cloud based storage location, the information classification model.

In one or more examples, the computing platform may continuously classify, using the information classification model and after identifying the first cloud based storage location, the first information. In one or more examples, based on identifying an updated classification for the first information, the computing platform may identify, using at least one smart contract, whether or not a new storage location should be identified. Based on identifying that the new storage location should be identified, the computing platform may identify, using the information classification model, a second cloud based storage location for the first information. The computing platform may send, to the cloud based storage system, one or more commands directing the cloud based storage system to move the first information from the first cloud based storage location to the second cloud based storage location, which may cause the cloud based storage system to move the first information from the first cloud based storage location to the second cloud based storage location.

In one or more instances, based on identifying the second cloud based storage location, the computing platform may: 1) burn the first NFT, 2) generate a second NFT representative of the second cloud based storage location, 3) store, to a distributed ledger, the second NFT, and 4) send, to the user device, the second NFT. In one or more instances, the computing platform may receive, from the user device, the second NFT and a second request to access the first information. Based on validating the second NFT, the computing platform may grant the user device access to the first information.

BRIEF DESCRIPTION OF DRAWINGS

The present disclosure is illustrated by way of example and is not limited in the accompanying figures in which like reference numerals indicate similar elements and in which.

DETAILED DESCRIPTION

Figure 1A:
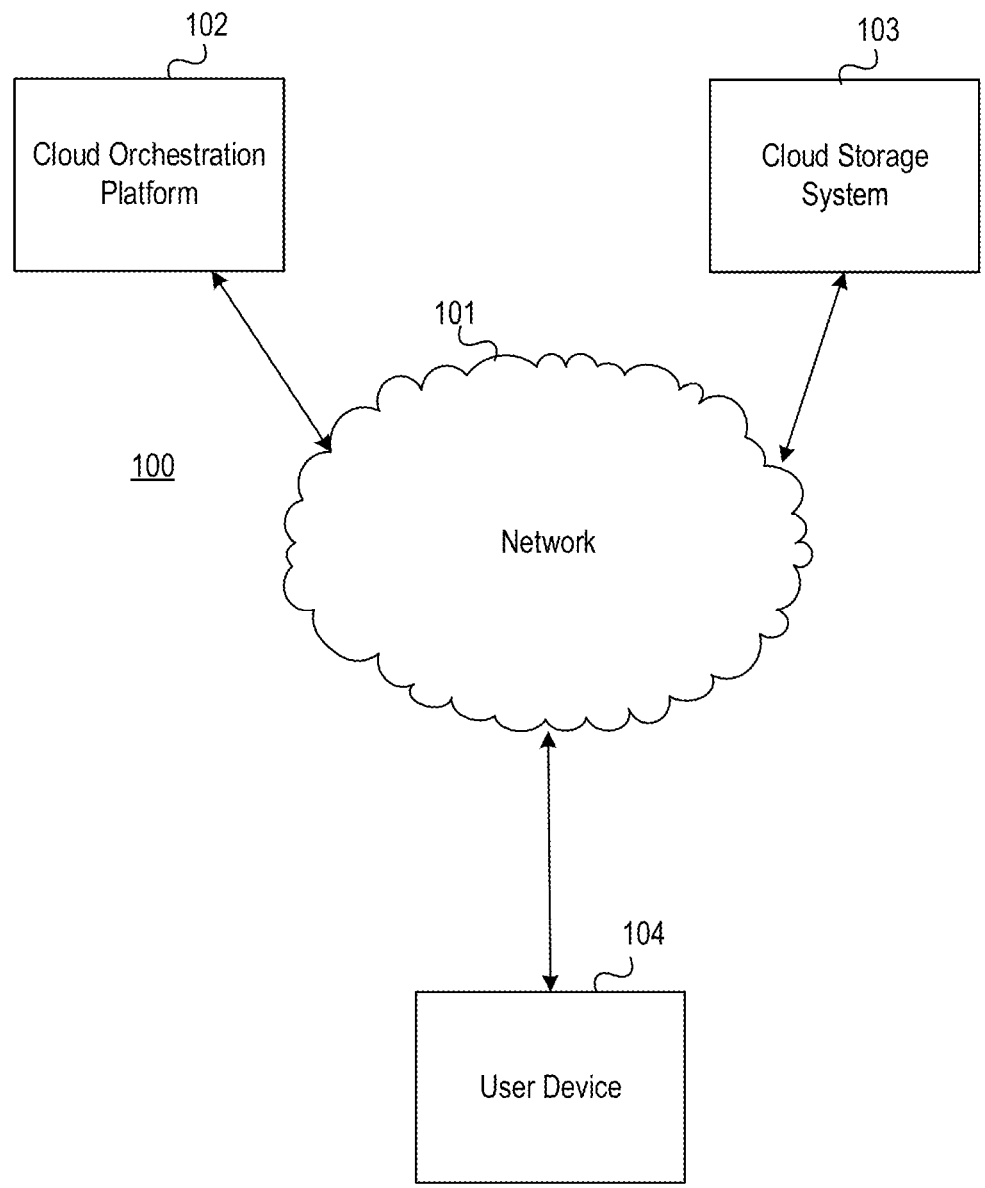
FIGS. 1A and 1B depict an illustrative computing environment for securely managing data storage in a cloud infrastructure leveraging NFTs in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to securely managing cloud data storage using NFTs, as is described further below. Cloud computing is the on-demand availability of computer system resources, especially data storage and computing power, without direct active management by the user. Large clouds may have functions distributed over multiple locations, each of which may be a data center. There is a need to develop a technical method that provides a secure, zero trust cloud computing infrastructure where customer hosted data is orchestrated by data centers in a secure manner.

Accordingly, described herein is an intelligent apparatus that securely orchestrates data storage in a cloud infrastructure (e.g., data center, rack, servers, virtual nodes, or the like), leveraging non-fungible tokens (NFTs). Based on user requests, the system may identify secure clusters in a cloud infrastructure by understanding the contextual properties of the data (e.g., cross border requirements, data sensitivity, latency to fetch information, or the like). The method may mint NFTs based on metadata properties of identified data storage memory clusters, where each cluster may be represented by an NFT and may store all metadata related information about hardware, software, and/or data classification requirements. NFT data storage clusters may behave like digital assets orchestrated by a smart contract. The smart contracts may hold predefined rules to manage cluster and data integrity. An overall smart contract may orchestrate smart sub-contracts to manage NFT data storage clusters. An artificial intelligence (AI) driven engine may enable NFT data storage clusters to merge to form new clusters based on a data sensitivity rule engine. To extract information from cloud storage systems, the program may validate NFT certificates associated with each cluster. Through an API call, the system may validate the cluster and extract data. The method may keep track of minted NFTs associated with clusters, an artificial intelligence-machine learning (AI-ML) algorithm (e.g., LSTM neural net) may sense changes in data and mint new NFTs or combine NFTs. In some instances, the system may include a data request analyzer module, a data context extraction module, a data storage cluster metadata extraction module, a data security rule engine, an NFT generation module, a smart contract module, a data extraction module, and/or other components.

For a data package, there might be N number of NFT clusters that store data in a cloud infrastructure. The NFT data storage cluster may be burned by sending it to a wallet address where no one can access it (e.g., a null address), making the NFT unusable. This method may provide ownership rights of cloud infrastructure to customers thereby ensuring data security confidence. These and other features are described in greater detail below.

Figure 1B:
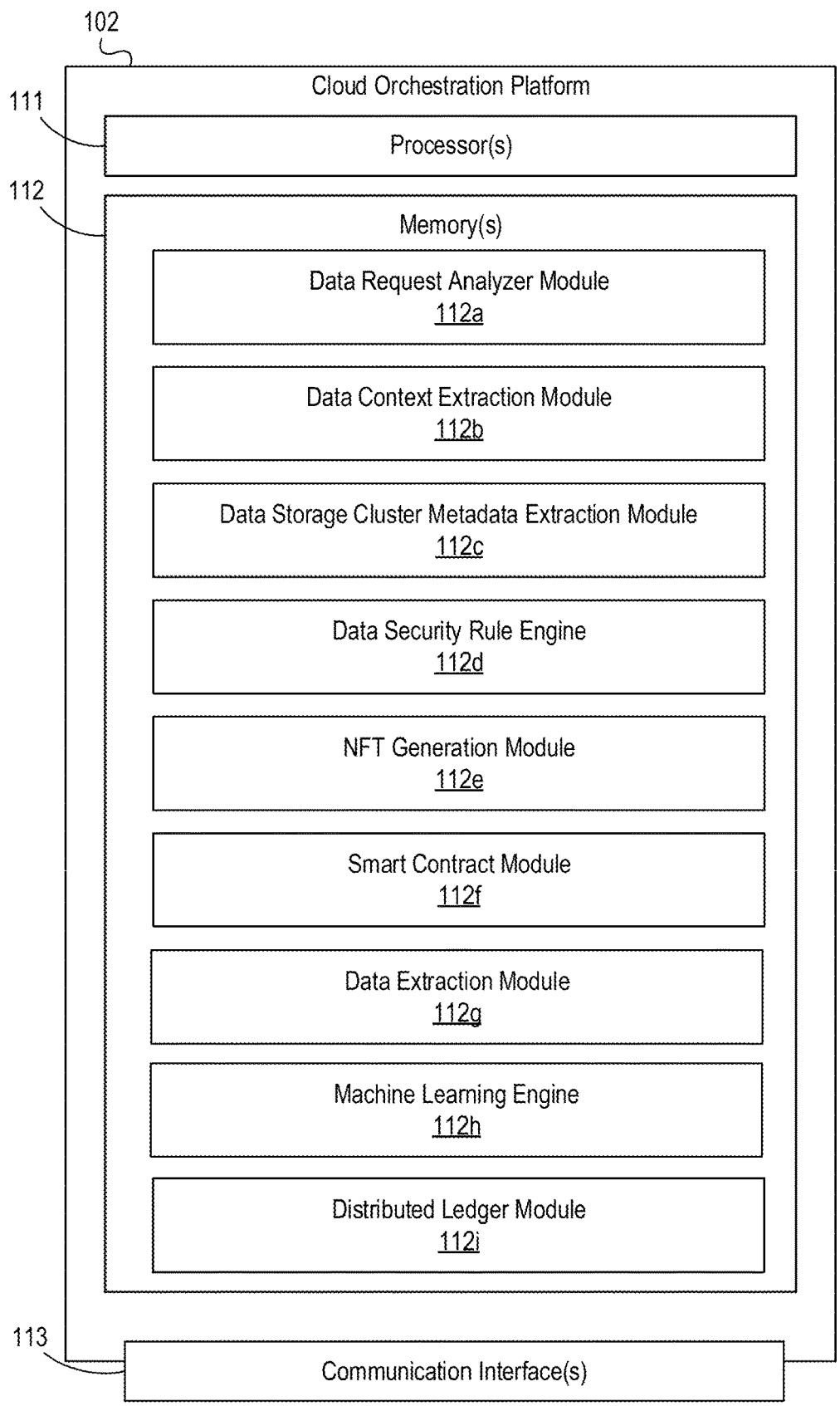

FIGS. 1A-1B depict an illustrative computing environment for securely managing data storage in a cloud infrastructure leveraging NFTs in accordance with one or more example embodiments. Referring to FIG. 1A, computing environment 100 may include one or more computer systems. For example, computing environment 100 may include a cloud orchestration platform 102, cloud storage system 103, and user device 104.

Cloud orchestration platform 102 may include one or more computing devices and/or other computer components (e.g., processors, memories, communication interfaces, or the like). For example, the cloud orchestration platform 102 may be configured to receive information storage requests, and identify secure storage locations accordingly. In some instances, the cloud orchestration platform 102 may be configured to train, apply and/or otherwise maintain a machine learning model that may be configured to classify information and identify storage locations accordingly. In some instances, the cloud orchestration platform 102 may be further configured to generate NFTs representative of the storage locations, and to validate the NFTs prior to granting access to any requested information. In some instances, the cloud orchestration platform 102 may be configured to host, maintain, and/or otherwise access a distributed ledger to store and/or validate the NFTs. In some instances, the cloud orchestration platform 102 may be a quantum computing platform. In some instances, the cloud orchestration platform 102 may be maintained and/or otherwise accessed by a plurality of organizations (e.g., rather than a single organization).

Cloud storage system 103 may include one or more computing devices and/or other computer components (e.g., processors, memories, communication interfaces, and/or other components). In some instances, the cloud storage system 103 may be configured to store information at a location defined by clusters, data centers, racks, servers, and virtual nodes. For example, the cloud storage system 103 may be configured with one or more clusters. Each cluster may be a collection of data centers. Each data center may be a collection of racks. Each rack may be a collection of servers. Each server may contain a plurality (e.g., 256, or the like) of virtual nodes.

User device 104 may be or include one or more devices (e.g., laptop computers, desktop computer, smartphones, tablets, and/or other devices) configured for use in storing and accessing information. In some instances, the user device 104 may be configured to display graphical user interfaces (e.g., storage confirmation interfaces, information access interfaces, or the like). Any number of such user devices may be used to implement the techniques described herein without departing from the scope of the disclosure.

Computing environment 100 also may include one or more networks, which may interconnect cloud orchestration platform 102, cloud storage system 103, and user device 104. For example, computing environment 100 may include a network 101 (which may interconnect, e.g., cloud orchestration platform 102, cloud storage system 103, and user device 104).

In one or more arrangements, cloud orchestration platform 102, cloud storage system 103, and user device 104 may be any type of computing device capable of receiving a user interface, receiving input via the user interface, and communicating the received input to one or more other computing devices. For example, cloud orchestration platform 102, cloud storage system 103, user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of cloud orchestration platform 102, cloud storage system 103, and user device 104 may, in some instances, be special-purpose computing devices configured to perform specific functions.

Referring to FIG. 1B, cloud orchestration platform 102 may include one or more processors 111, memory 112, and communication interface 113. A data bus may interconnect processor 111, memory 112, and communication interface 113. Communication interface 113 may be a network interface configured to support communication between cloud orchestration platform 102 and one or more networks (e.g., network 101, or the like). Memory 112 may include one or more program modules having instructions that when executed by processor 111 cause cloud orchestration platform 102 to perform one or more functions described herein and/or one or more databases that may store and/or otherwise maintain information which may be used by such program modules and/or processor 111. In some instances, the one or more program modules and/or databases may be stored by and/or maintained in different memory units of cloud orchestration platform 102 and/or by different computing devices that may form and/or otherwise make up cloud orchestration platform 102. For example, memory 112 may have, host, store, and/or include data request analyzer module 112a, data context extraction module 112b, data storage cluster metadata extraction module 112c, data security rule engine 112d, NFT generation module 112e, smart contract module 112f, data extraction module 112g, machine learning engine 112h, and distributed ledger module 112i. Data request analyzer module 112a may have instructions that direct and/or cause cloud orchestration platform 102 to analyze data storage requests. Data context extraction module 112b may have instructions that direct and/or cause cloud orchestration platform 102 to extract context associated with data from the data storage requests. Data storage cluster metadata extraction module 112c may have instructions that direct and/or cause cloud orchestration platform 102 to identify metadata corresponding to cloud based storage (e.g., data stored at the cloud storage system 103). Data security rule engine 112d may have instructions that direct and/or cause cloud orchestration platform 102 to configure and/or otherwise store rules associated data security. NFT generation module 112e may have instructions that direct and/or cause cloud orchestration platform 102 to generate NFTs corresponding to data storage locations. Smart contract module 112f may have instructions that direct and/or cause cloud orchestration platform 102 to manage and/or otherwise apply smart contracts to data classifications, which may, e.g., enable the cloud orchestration platform 102 to identify whether or not a new storage location and/or NFT are needed for stored data. Data extraction module 112g may have instructions that direct and/or cause the cloud orchestration platform 102 to obtain cloud based stored data in response to receiving a data access request. Machine learning engine 112h may be used to train, deploy, and/or otherwise refine models used to classify data and/or identify data storage locations through both initial training and one or more dynamic feedback loops, which may, e.g., enable continuous improvement of the cloud orchestration platform 102 and further optimize the secure cloud based storage of data. Distributed ledger module 112i may be used to generate, maintain, and/or otherwise access a distributed ledger for NFT storage and/or validation.

Figure 2A:
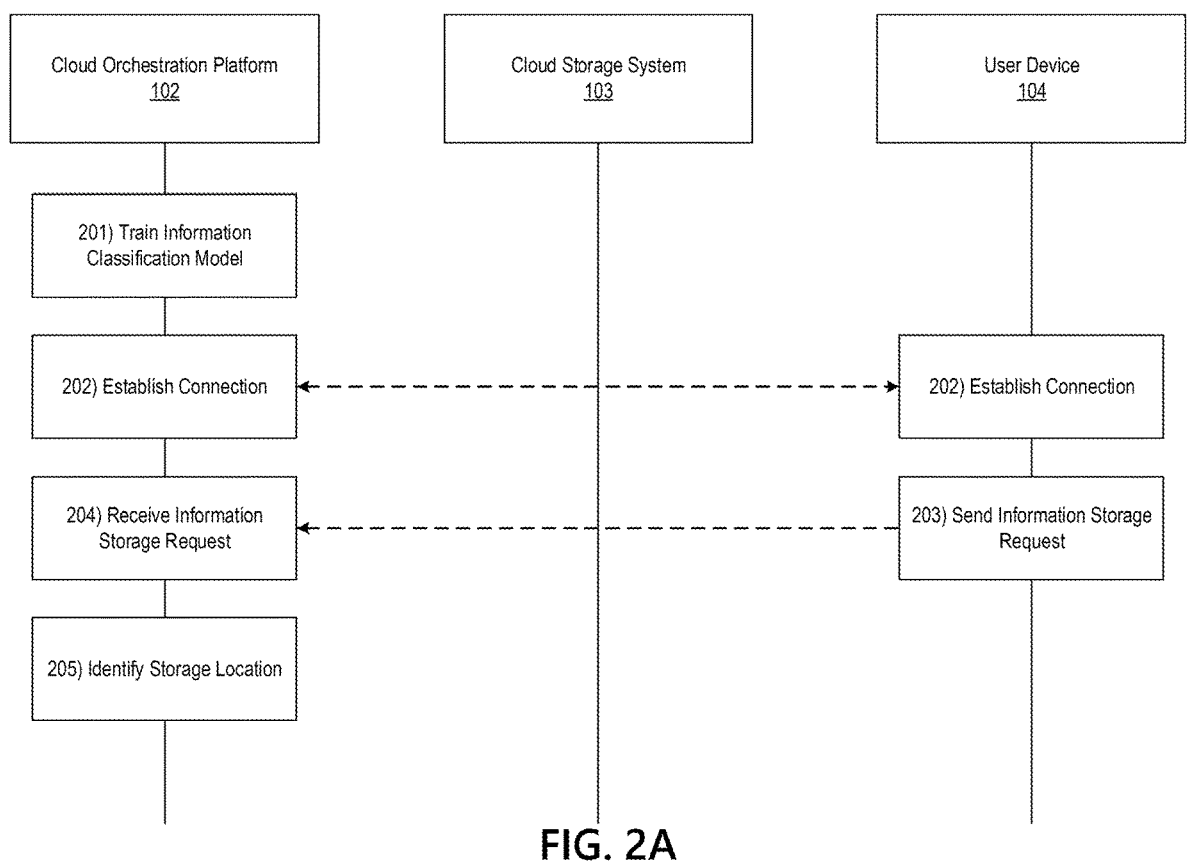
FIGS. 2A-2E depict an illustrative event sequence for securely managing data storage in a cloud infrastructure leveraging NFTs in accordance with one or more example embodiments.

FIGS. 2A-2E depict an illustrative event sequence for securely managing data storage in a cloud infrastructure leveraging NFTs in accordance with one or more example embodiments. Referring to FIG. 2A, at step 201, the cloud orchestration platform 102 may train an information classification model. For example, the cloud orchestration platform 102 may obtain historical information classification information, such as information/data itself, information metadata, sensitivity levels, processing requirements, cross border movement requirements, latency requirements, information classification labels, and/or other data characteristics that may be used to classify data (e.g., in terms of sensitivity, processing requirements, and/or other features). For example, the cloud orchestration platform 102 may feed labelled historical data into the information classification model (e.g., labelled based on corresponding sensitivity, processing requirements, cross border requirements, and/or otherwise). In doing so, the cloud orchestration platform 102 may train the information classification model to establish stored correlations between the historical data and its corresponding label/classification information, which may, e.g., enable the information classification model to establish a correlation between input data and a corresponding classification.

The cloud orchestration platform 102 may further train the information classification model to identify, based on the data classification information, cloud storage locations. For example, the information classification model may be trained based on security levels corresponding to various cloud storage locations, and/or otherwise to identify current latency, processing speed, and/or other conditions of the cloud storage locations, which may, e.g., enable the information classification model to identify an optimal (e.g., in terms of satisfying any data storage requirements such as sensitivity requirements, latency/processing requirements, cross border requirements, and/or otherwise) cloud storage location for information. In some instances, the cloud orchestration platform 102 may be trained to generate storage location scores corresponding to identified storage locations. In these instances, the cloud orchestration platform 102 may train the information classification model to rank the storage locations based on their storage location scores and select, for example, the highest ranked location.

In some instances, in training the information classification model, the cloud orchestration platform 102 may train a supervised learning model. For example, the cloud orchestration platform 102 may train one or more of: decision trees, ensembles (e.g., boosting, bagging, random forest, or the like), neural networks, linear regression models, artificial neural networks (e.g., long short-term memory (LSTM) or the like), logistic regression models, support vector machines, and/or other supervised learning models. Additionally or alternatively, the cloud orchestration platform 102 may train the information classification model using one or more unsupervised learning techniques (e.g., classification, regression, clustering, anomaly detection, artificial neutral networks, and/or other supervised models/techniques) through a dynamic feedback loop.

At step 202, the user device 104 may establish a connection with the cloud orchestration platform 102. For example, the user device 104 may establish a first wireless data connection with the cloud orchestration platform 102 to link the user device 104 to the cloud orchestration platform 102 (e.g., in preparation for requesting data storage). In some instances, the user device 104 may identify whether or not a connection is already established with the cloud orchestration platform 102. If a connection is already established with the cloud orchestration platform 102, the user device 104 might not re-establish the connection. Otherwise, if a connection is not yet established with the cloud orchestration platform 102, the user device 104 may establish the first wireless data connection as described herein.

At step 203, the user device 104 may send an information storage request to the cloud orchestration platform 102. For example, the user device 104 may send the information storage request to the cloud orchestration platform 102 while the first wireless data connection is established.

At step 204, the cloud orchestration platform 102 may receive the information storage request sent at step 203. For example, the cloud orchestration platform 102 may receive the information storage request via the communication interface 113 and while the first wireless data connection is established.

At step 205, the cloud orchestration platform 102 may identify a storage location for the information corresponding to the information storage request. For example, the cloud orchestration platform 102 may feed the information into the information classification model (e.g., trained at step 201). In some instances, the cloud orchestration platform 102 may extract metadata and/or other parameters corresponding to the information, and may feed this metadata and/or other parameters into the information classification model as well. For example, the cloud orchestration platform 102 may feed information such as information type, account information, value information, address information, location information, data size, sensitivity levels, processing requirements, cross border movement requirements, latency requirements, and/or other information into the information classification model. In doing so, the information classification model may classify the information (e.g., in terms of sensitivity, data processing requirements, cross border requirements, and/or otherwise) by comparing the information and its corresponding metadata to the historical information/information classification information used to train the information classification model). For example, the information classification model may score the information, for example, in terms of sensitivity on a scale of 1-10 with 1 being the least sensitive and 10 being the most sensitive. Similarly, the information classification model may score the information, for example, in terms of data processing requirements on a scale of 1-10, with 1 being the least time sensitive and 10 being the most time sensitive and/or in terms of data size (e.g., with 1 being the smallest and 10 being the largest data sizes).

After classifying the information, the information classification model may use the classifications, classification scores, and/or current storage conditions at the cloud storage system 103 to identify a storage location for the information. For example, certain portions of the cloud storage system 103 may have greater security measures (e.g., additional encryption layers, or the like), and thus may be more secure than other portions of the cloud storage system 103. Similarly, certain portions of the cloud storage system 103 may enable quicker data access than others (e.g., edge storage may provide quicker data access than centralized storage). In some instances, based on the classification of the information, the information classification model may output a cluster, data center, rack, server, and/or node at which to store the information. In some instances, information classification model may output a location within a child memory, which may be located within a parent memory.

In some instances, the cloud orchestration platform 102 may be a quantum computing platform configured to run multiple analysis in parallel, thus generating a plurality of potential storage locations simultaneously. In these instances, the cloud orchestration platform 102 may rank the plurality of potential storage locations (e.g., based on the corresponding security level, processing speed, processing capacity, and/or otherwise), and may select the highest ranked location.

Figure 2B:
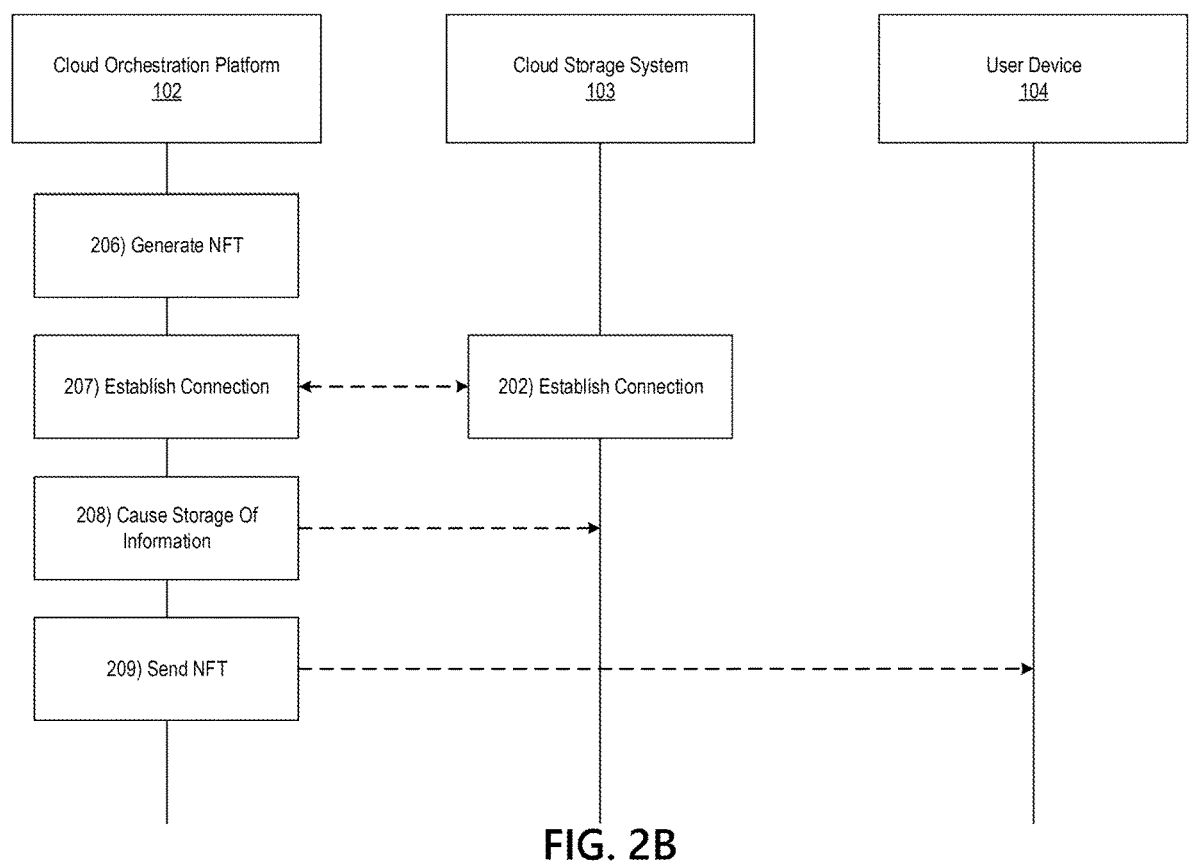

Referring to FIG. 2B, at step 206, the cloud orchestration platform 102 may generate an NFT representative of the location information generated at step 205. For example, the cloud orchestration platform 102 may generate an NFT that may be used to validate and/or otherwise approve access to the location and the information stored therein. In some instances, the cloud orchestration platform 102 may store the NFT to a distributed ledger, which may, e.g., be hosted and/or otherwise maintained by the cloud orchestration platform 102 and/or other system. For example, the cloud orchestration platform 102 may add a new entry corresponding to the distributed ledger that includes the NFT, modify an existing entry to include the NFT, and/or otherwise incorporate the NFT into the distributed ledger. In some instances, the distributed ledger may be secured using quantum encryption, and/or other methods.

At step 207, the cloud orchestration platform 102 may establish a connection with the cloud storage system 103. For example, the cloud orchestration platform 102 may establish a second wireless data connection with the cloud storage system 103 to link the cloud orchestration platform 102 to the cloud storage system 103 (e.g., in preparation for storing information). In some instances, the cloud orchestration platform 102 may identify whether or not a connection is already established with the cloud storage system 103. If a connection is already established with the cloud storage system 103, the cloud orchestration platform 102 might not re-establish the connection. Otherwise, if a connection is not yet established with the cloud storage system 103, the cloud orchestration platform 102 may establish the second wireless data connection as described herein.

At step 208, the cloud orchestration platform 102 may cause storage of the information at the location identified at step 205. For example, the cloud orchestration platform 102 may send one or more commands directing the cloud storage system 103 to store the information at the identified location (which may, e.g., cause the cloud orchestration platform 102 to store the information at the identified location). For example, the cloud orchestration platform 102 may send these commands via the communication interface 113 and while the second wireless data connection is established.

At step 209, the cloud orchestration platform 102 may send the NFT, generated at step 206, to the user device 104. For example, the cloud orchestration platform 102 may send the NFT via the communication interface 113 and while the first wireless data connection is established. In doing so, the cloud orchestration platform 102 may provide the user device 104 with an authentication mechanism with which it may securely access the stored information. In these instances, the user device 104 may store the NFT for later use. In doing so, the user may be confident that their information is secure (e.g., as access to the information may be prevented to anyone that does not have the NFT).

Figure 5:
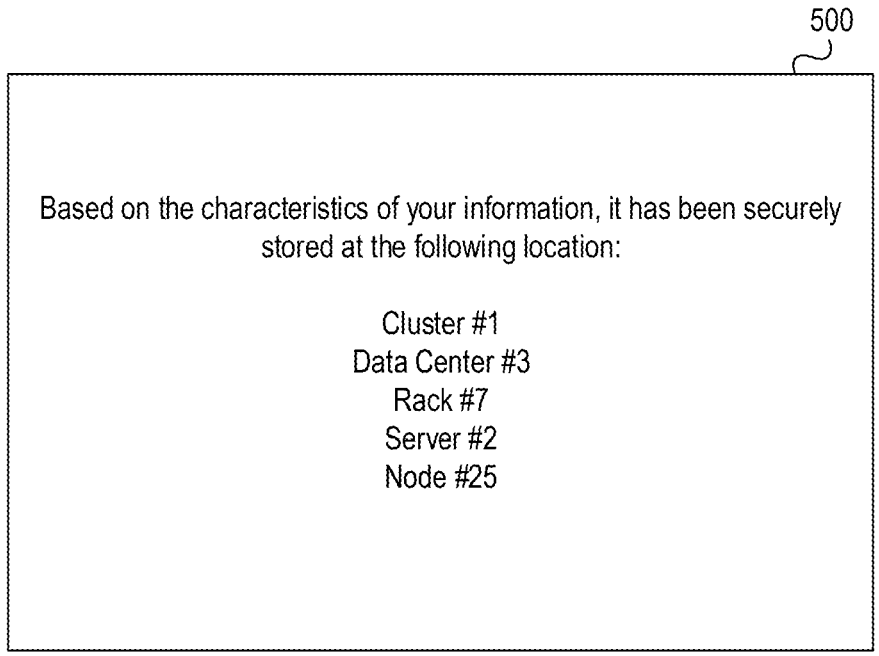
FIGS. 5 and 6 depict illustrative user interfaces for securely managing data storage in a cloud infrastructure leveraging NFTs in accordance with one or more example embodiments.

In some instances, along with the NFT, the cloud orchestration platform 102 may also send an indication of the storage location and/or a storage confirmation to the user device 104. In some instances, the cloud orchestration platform 102 may also send one or more commands directing the user device 104 to display the storage location and/or storage confirmation, which may, e.g., cause the user device 104 to display a graphical user interface similar to graphical user interface 500, which is illustrated in FIG. 5.

Figure 2C:
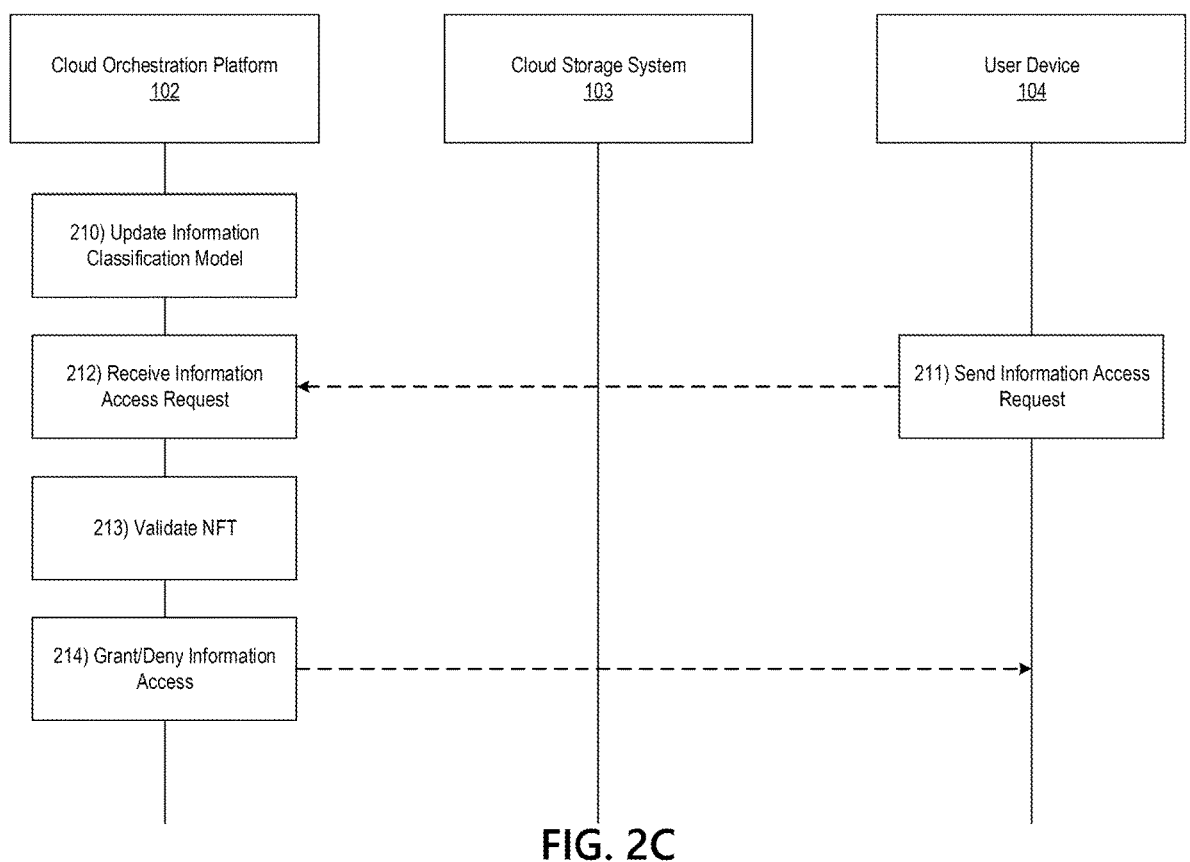

Referring to FIG. 2C, at step 210, the cloud orchestration platform 102 may update the information classification model. For example, the cloud orchestration platform 102 may update the information classification model based on the classification of the information and/or the identified location. In doing so, the cloud orchestration platform 102 may continue to refine the information classification model using a dynamic feedback loop, which may, e.g., increase the accuracy and effectiveness of the information classification model in classifying information and identifying optimal storage locations accordingly.

In some instances, the cloud orchestration platform 102 may continuously refine the information classification model. In some instances, the cloud orchestration platform 102 may maintain accuracy thresholds for the information classification model, and may pause refinement (through the dynamic feedback loop) of the information classification model if the corresponding accuracy is identified as greater than the corresponding accuracy threshold. Similarly, if the accuracy fails to be equal or less than the given accuracy threshold, the cloud orchestration platform 102 may resume refinement of the information classification model through the corresponding dynamic feedback loop.

At step 211, the user device 104 may send an information access request to the cloud orchestration platform 102. For example, the user device 104 may send a request to access the information stored at the identified location of the cloud storage system 103. In some instances, the user device 104 may send, along with the information access request, the NFT. In some instances, the user device 104 may send the information access request to the cloud orchestration platform 102 while the first wireless data connection is established.

At step 212, the cloud orchestration platform 102 may receive the information access request sent at step 211. In some instances, the cloud orchestration platform 102 may also receive the NFT. In some instances, the cloud orchestration platform 102 may receive the information access request via the communication interface 113 and while the first wireless data connection is established.

At step 213, the cloud orchestration platform 102 may attempt to validate the NFT received at step 212. For example, the cloud orchestration platform 102 may access the stored version of the NFT from the distributed ledger, and may compare the received NFT to the stored NFT for validation.

Figure 6:
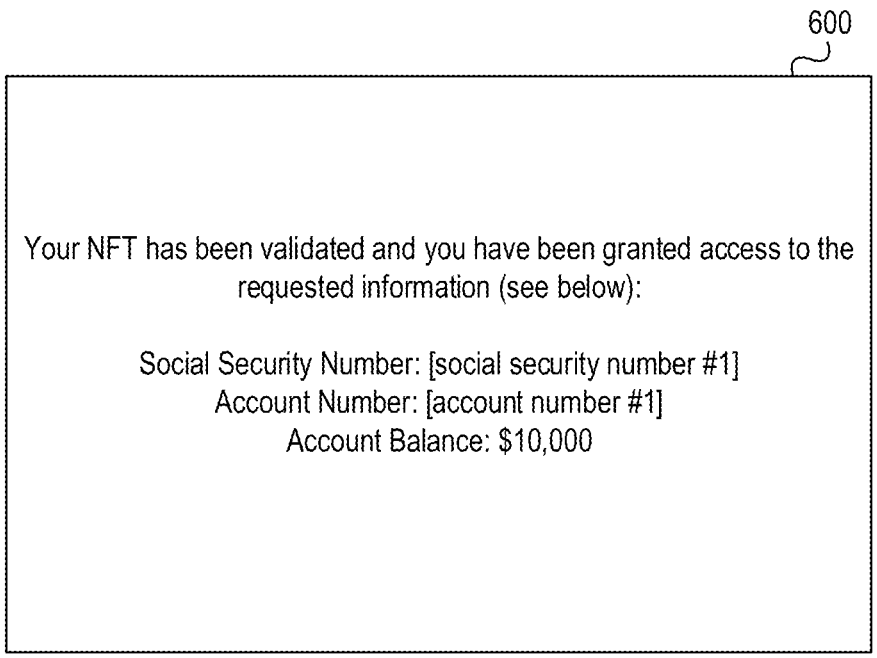

At step 214, the cloud orchestration platform 102 may grant or deny access to the information based on the validation attempt at step 213. For example, if the cloud orchestration platform 102 successfully validates the NFT, the cloud orchestration platform 102 may grant the user device 104 access to the information. For example, the cloud orchestration platform 102 may fetch the information from the storage location and provide it to the user device 104, grant the user device 104 direct access to the storage location, and/or otherwise provide the user device 104 access to the information. For example, in these instances, the cloud orchestration platform 102 may send one or more commands directing the user device 104 to display an information interface, which may, e.g., cause the user device 104 to display a graphical user interface similar to graphical user interface 600, which is illustrated in FIG. 6. In contrast, if the cloud orchestration platform 102 fails to validate the NFT, the cloud orchestration platform 102 might not grant the user device 104 access to the information.

Figure 2D:
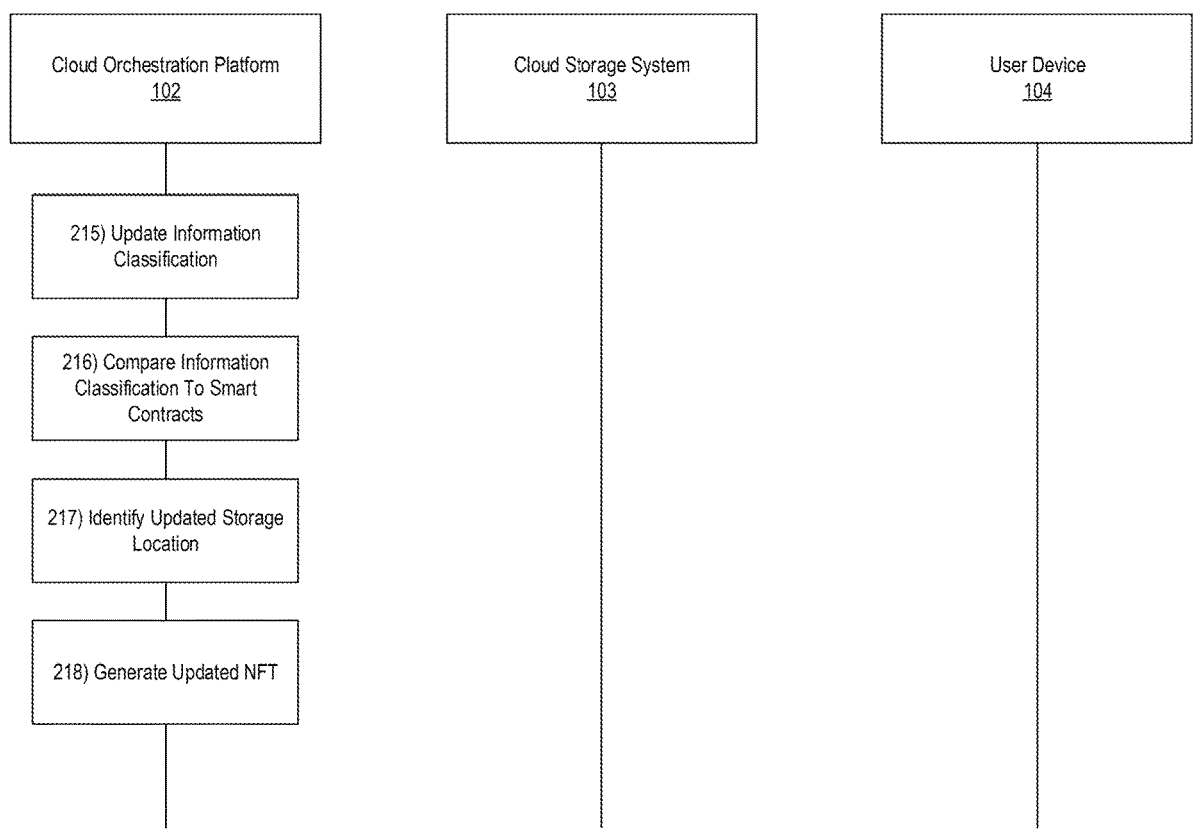

Referring to FIG. 2D, at step 215, the cloud orchestration platform 102 may continue to analyze the information using the image classification model. For example, the cloud orchestration platform 102 may analyze the information continuously, at a predetermined interval, and/or otherwise. For example, in some instances, a sensitivity level, cross border requirements, data processing requirements, and/or other classifications of the information may change. Accordingly, the cloud orchestration platform 102 may continue to analyze the information using the image classification model to re-classify the information accordingly (e.g., by performing actions similar to those described above with regard to the initial classification of the information at step 205). If the classification does change as a result of the updated analysis, the cloud orchestration platform 102 may proceed to step 216. Otherwise, if the classification does not change, the cloud orchestration platform 102 may continue to run the information classification model.

At step 216, the cloud orchestration platform 102 may compare the classification to one or more smart contracts, which may, e.g., indicate whether or not a storage location of the information should be updated based on the updated classification. For example, one or more smart contracts may be preconfigured at the cloud orchestration platform 102, which may, e.g., indicate rules for when information locations should be updated. For example, a first smart contract may indicate that if a sensitivity score/classification of the information falls below a sensitivity threshold (whereas it previously met or exceeded the threshold), the information need not be relocated. However, the first smart contract may also indicate that if the sensitivity score/classification of the information meets or exceeds a sensitivity threshold (whereas it previously did not), the information should be relocated to a more secure storage location. Similarly, a second smart contract may indicate that if a processing speed requirement reduces a required processing speed to below a processing threshold, the information should be relocated to a storage location corresponding to faster data access (e.g., edge storage, or the like). Likewise, the second smart contract may indicate that if a processing speed requirement increases a required processing speed to meet or exceed the processing threshold, the information may be relocated to make the faster data access location accessible to alternative information (e.g., and thus the information should be relocated to alternative storage (e.g., central storage or the like)).

In some instances, an overall smart contract corresponding to the entire cloud storage system 103 (or a part thereof) may be used to identify whether or not a mass reorganization should be performed. For example, the overall smart contract may indicate latency thresholds, or the like which (if exceeded) may trigger a mass relocation of information at the cloud storage system 103.

In these instances, if the smart contract comparison indicates that a location of the information should be updated, the cloud orchestration platform 102 may use the information classification model to identify an updated storage location using methods similar to those described above with regard to step 205.

At step 218, based on identifying the updated storage location at step 217, the cloud orchestration platform 102 may burn (e.g., delete and/or otherwise render obsolete/ineffective) the previously generated NFT and generated a new NFT, representative of the new storage location. For example, the cloud orchestration platform 102 may generate a new NFT using techniques similar to those described above with regard to step 206. In these instances, the cloud orchestration platform 102 may similarly store the new NFT to the distributed ledger. In some instances, the original NFT may have included a term of validity (e.g., one year, or the like). In these instances, the cloud orchestration platform 102 may identify that the new NFT should be generated based on identifying expiration of this time period (and that the original NFT should be burned). Additionally or alternatively, the cloud orchestration platform 102 may merge existing NFTs into the new NFT (e.g., if two types of information for a user are stored separately with separate NFTs).

Figure 2E:
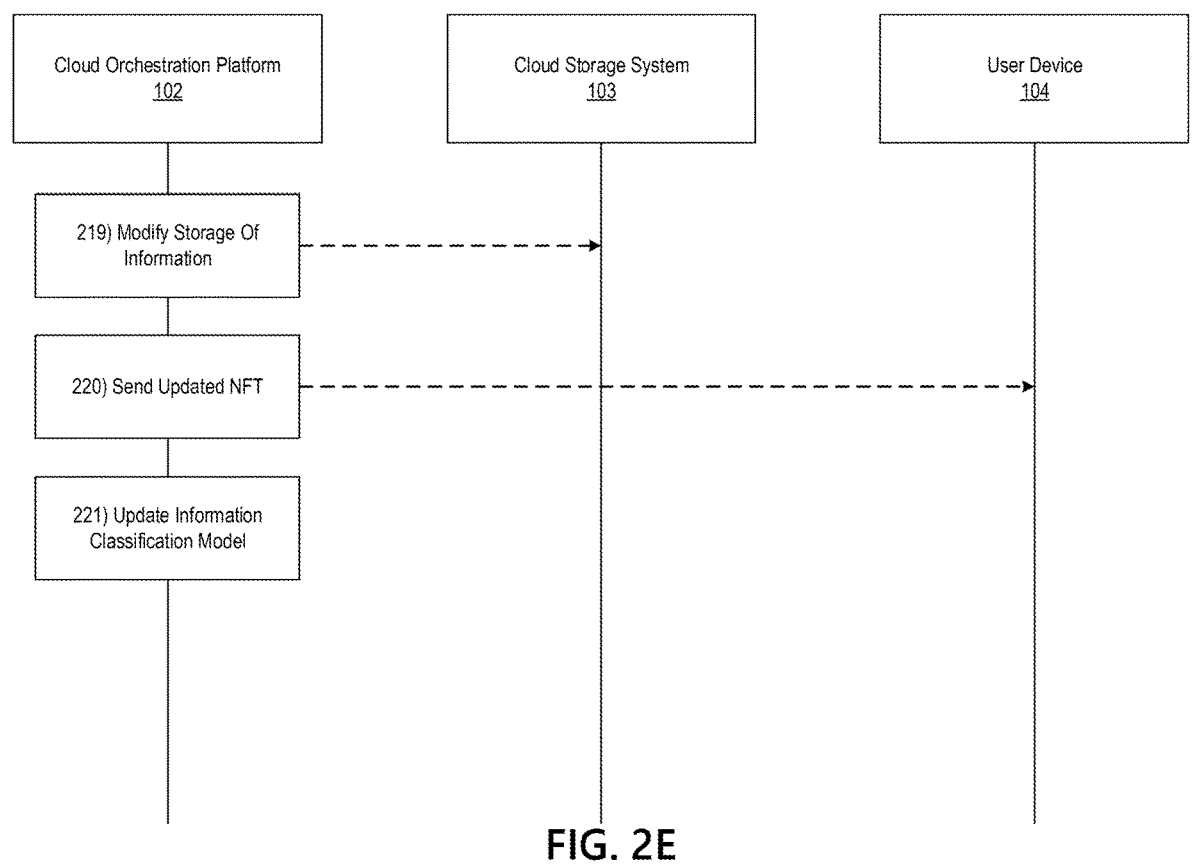

Referring to FIG. 2E, at step 219, the cloud orchestration platform 102 may modify storage of the information at the cloud storage system 103. For example, the cloud orchestration platform 102 may send one or more commands directing the cloud storage system 103 to relocate the information to the new storage location (which may, e.g., cause the cloud storage system 103 to relocate the information to the new storage location). In some instances, the cloud orchestration platform 102 may send these commands via the communication interface 113 and while the second wireless data connection is established.

At step 220, the cloud orchestration platform 102 may send the new NFT to the user device 104. For example, the cloud orchestration platform 102 may send the new NFT to the user device 104 via the communication interface 113 and while the first wireless data connection is established. The user device 104 may then store the new NFT for subsequent use. For example, in subsequent requests for the information, the user device 104 may provide the new NFT, which the cloud orchestration platform 102 may validate using the distributed ledger as described above with regard to validation of the original NFT.

At step 221, the cloud orchestration platform 102 may further update the information classification model based on the updated information classification and/or the new location. For example, the cloud orchestration platform 102 may perform actions similar to those described above with regard to updating the information classification model at step 210.

Figure 3:
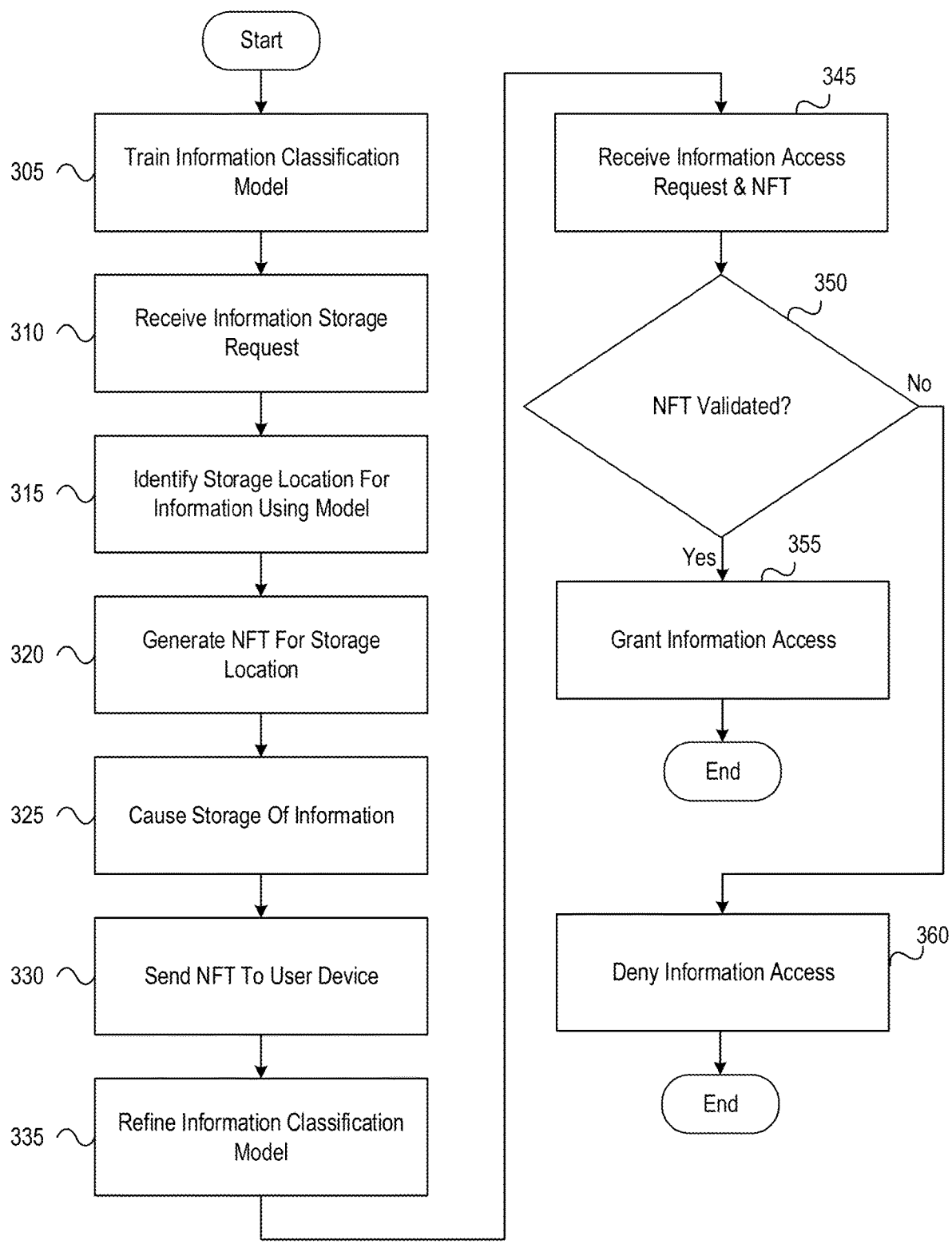
FIGS. 3 and 4 depict illustrative methods for securely managing data storage in a cloud infrastructure leveraging NFTs in accordance with one or more example embodiments.

FIG. 3 depicts an illustrative method for securely managing data storage in a cloud infrastructure leveraging NFTs in accordance with one or more example embodiments. Referring to FIG. 3, at step 305, a computing platform comprising one or more processors, memory, and a communication interface may train an information classification model. At step 310, the computing platform may receive an information storage request from a user device. At step 315, the computing platform may identify a storage location for the information using the information classification model. At step 320, the computing platform may generate an NFT representing the storage location. At step 325, the computing platform may cause storage of the information at the identified location. At step 330, the computing platform may send the NFT to the user device. At step 335, the computing platform may refine the information classification model based on the output of the information classification model. At step 345, the computing platform may receive a request to access the information along with the NFT. At step 350, the computing platform may identify whether or not the NFT is validated. If the NFT is validated, the computing platform may proceed to step 355 to grant the user device access to the information. If the NFT is not validated, the computing platform may proceed to step 360 to deny the user device access to the information.

Figure 4:
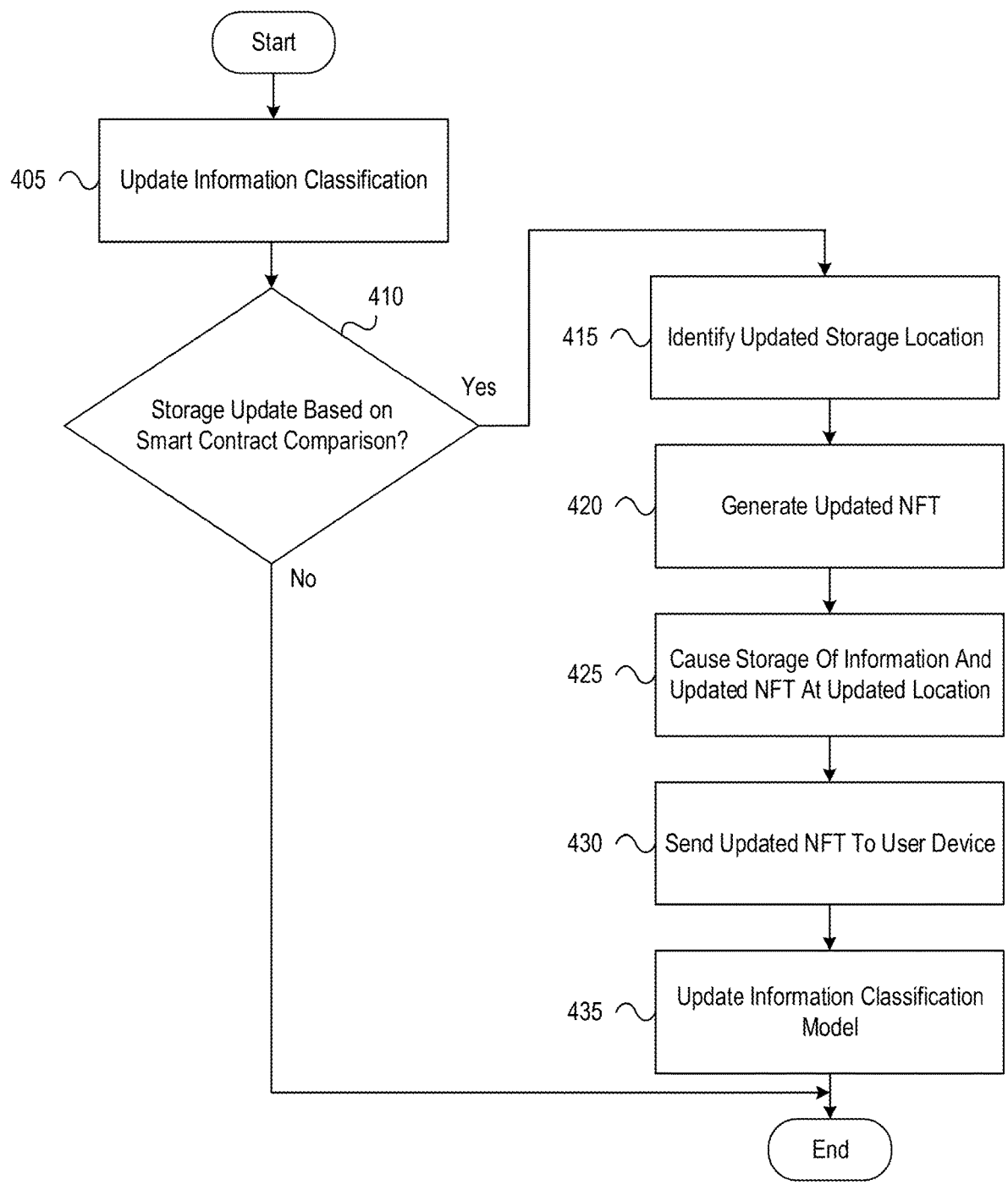

FIG. 4 depicts an illustrative method for securely managing data storage in a cloud infrastructure leveraging NFTs in accordance with one or more example embodiments. Referring to FIG. 4, at step 405, a computing platform comprising one or more processors, memory, and a communication interface may update classification information of stored information. At step 410, the computing platform may identify, using one or more smart contracts, whether or not a stored location of the information should be updated. If the location should not be updated, the method may end. Otherwise, if the location should be updated, the computing platform may proceed to step 415.

At step 415, the computing platform may identify an updated storage location. At step 420, the computing platform may generate and store an updated NFT for the updated storage location. At step 425, the computing platform may cause storage of the information at the updated location. At step 430, the computing platform may send the updated NFT to the user device. At step 435, the computing platform may update the information classification model based on the updated classification/location.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   train, using historical information classification information, an information classification model, wherein training the information classification model configures the information classification model to classify information and identify, based on the classification, a storage location;
   receive, from a user device, a request to store first information;
   identify, using the information classification model, a first cloud based storage location for the first information;
   generate a first non-fungible token (NFT) representative of the first cloud based storage location;
   send one or more commands directing a cloud based storage system to store the first information at the first cloud based storage location, wherein sending the one or more commands directing the cloud based storage system to store the first information at the first cloud based storage location causes the cloud based storage system to store the first information at the first cloud based storage location;
   send, to the user device, the first NFT;
   receive, from the user device, the first NFT and a first request to access the first information;
   validate the first NFT; and
   based on validating the first NFT, grant the user device access to the first information.

2. The computing platform of claim 1, wherein the historical information classification information comprises one or more of: information metadata, sensitivity levels, processing requirements, cross border movement requirements, latency requirements, or information classification labels.

3. The computing platform of claim 1, wherein identifying, using the information classification model, the first cloud based storage location for the first information comprises:
   extracting metadata for the first information, wherein the metadata comprises one or more of: sensitivity levels, processing requirements, cross border movement requirements, or latency requirements,
   identifying, by using the metadata of the first information to classify the first information based on the historical information classification information, one or more classification labels for the first information, and
   identifying, based on the one or more classification labels, the first cloud based storage location.

4. The computing platform of claim 1, wherein the first cloud based storage location comprises: a cluster, a data center within the cluster, a rack within the data center, server within the rack, and a node within the server.

5. The computing platform of claim 1, wherein the memory stores additional computer readable instructions that, when executed by the at least one processor, cause the computing platform to:
   store, using a distributed ledger, the first NFT, wherein validating the first NFT comprises validating, using the distributed ledger, the first NFT.

6. The computing platform of claim 1, wherein the memory stores additional computer readable instructions that, when executed by the at least one processor, cause the computing platform to:
   based on failing to validate the first NFT, deny the user device access to the first information.

7. The computing platform of claim 1, wherein the memory stores additional computer readable instructions that, when executed by the at least one processor, cause the computing platform to:
   update, using a dynamic feedback loop and based on the first cloud based storage location, the information classification model.

8. The computing platform of claim 1, wherein the memory stores additional computer readable instructions that, when executed by the at least one processor, cause the computing platform to:
   continuously classify, using the information classification model and after identifying the first cloud based storage location, the first information.

9. The computing platform of claim 8, wherein the memory stores additional computer readable instructions that, when executed by the at least one processor, cause the computing platform to:
   based on identifying an updated classification for the first information, identify, using at least one smart contract, whether or not a new storage location should be identified;
   based on identifying that the new storage location should be identified, identify, using the information classification model, a second cloud based storage location for the first information; and
   send, to the cloud based storage system, one or more commands directing the cloud based storage system to move the first information from the first cloud based storage location to the second cloud based storage location, wherein sending the one or more commands directing the cloud based storage system to move the first information from the first cloud based storage location to the second cloud based storage location causes the cloud based storage system to move the first information from the first cloud based storage location to the second cloud based storage location.

10. The computing platform of claim 9, wherein the memory stores additional computer readable instructions that, when executed by the at least one processor, cause the computing platform to:
    based on identifying the second cloud based storage location:
    burn the first NFT,
    generate a second NFT representative of the second cloud based storage location, store, to a distributed ledger, the second NFT, and send, to the user device, the second NFT.

11. The computing platform of claim 10, wherein the memory stores additional computer readable instructions that, when executed by the at least one processor, cause the computing platform to:
receive, from the user device, the second NFT and a second request to access the first information; and
based on validating the second NFT, grant the user device access to the first information.

12. A method comprising:
at a computing platform comprising at least one processor, a communication interface, and memory:
training, using historical information classification information, an information classification model, wherein training the information classification model configures the information classification model to classify information and identify, based on the classification, a storage location;
receiving, from a user device, a request to store first information;
identifying, using the information classification model, a first cloud based storage location for the first information;
generating a first non-fungible token (NFT) representative of the first cloud based storage location;
sending one or more commands directing a cloud based storage system to store the first information at the first cloud based storage location, wherein sending the one or more commands directing the cloud based storage system to store the first information at the first cloud based storage location causes the cloud based storage system to store the first information at the first cloud based storage location;
sending, to the user device, the first NFT;
receiving, from the user device, the first NFT and a first request to access the first information;
validating the first NFT; and
based on validating the first NFT, granting the user device access to the first information.

13. The method of claim 12, wherein the historical information classification information comprises one or more of: information metadata, sensitivity levels, processing requirements, cross border movement requirements, latency requirements, or information classification labels.

14. The method of claim 12, wherein identifying, using the information classification model, the first cloud based storage location for the first information comprises:
extracting metadata for the first information, wherein the metadata comprises one or more of: sensitivity levels, processing requirements, cross border movement requirements, or latency requirements,
identifying, by using the metadata of the first information to classify the first information based on the historical information classification information, one or more classification labels for the first information, and
identifying, based on the one or more classification labels, the first cloud based storage location.

15. The method of claim 12, wherein the first cloud based storage location comprises: a cluster, a data center within the cluster, a rack within the data center, server within the rack, and a node within the server.

16. The method of claim 12, further comprising:
storing, using a distributed ledger, the first NFT, wherein validating the first NFT comprises validating, using the distributed ledger, the first NFT.

17. The method of claim 12, further comprising:
based on failing to validate the first NFT, denying the user device access to the first information.

18. The method of claim 12, further comprising:
updating, using a dynamic feedback loop and based on the first cloud based storage location, the information classification model.

19. The method of claim 12, further comprising:
continuously classifying, using the information classification model and after identifying the first cloud based storage location, the first information.

20. One or more non-transitory computer-readable media storing instructions that, when executed by a computing platform comprising at least one processor, a communication interface, and memory, cause the computing platform to:
train, using historical information classification information, an information classification model, wherein training the information classification model configures the information classification model to classify information and identify, based on the classification, a storage location;
receive, from a user device, a request to store first information;
identify, using the information classification model, a first cloud based storage location for the first information;
generate a first non-fungible token (NFT) representative of the first cloud based storage location;
send one or more commands directing a cloud based storage system to store the first information at the first cloud based storage location, wherein sending the one or more commands directing the cloud based storage system to store the first information at the first cloud based storage location causes the cloud based storage system to store the first information at the first cloud based storage location;
send, to the user device, the first NFT;
receive, from the user device, the first NFT and a first request to access the first information;
validate the first NFT; and
based on validating the first NFT, grant the user device access to the first information.

* * * * *